(12) United States Patent
Karschnia et al.

(10) Patent No.: US 10,153,898 B2
(45) Date of Patent: *Dec. 11, 2018

(54) WIRELESS MESH NETWORK WITH SECURE AUTOMATIC KEY LOADS TO WIRELESS DEVICES

(75) Inventors: Robert J. Karschnia, Chaska, MN (US); Marcos Peluso, Chanhassen, MN (US); Daniel Carlson, St. Paul, MN (US); Jeffrey D. Potter, Shorewood, MN (US)

(73) Assignee: Rosemount Inc, Chanhassen, MN (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/479,869

(22) Filed: May 24, 2012

(65) Prior Publication Data
US 2012/0237034 A1  Sep. 20, 2012

Related U.S. Application Data

(63) Continuation of application No. 11/983,943, filed on Nov. 13, 2007, now Pat. No. 8,208,635.

(51) Int. Cl.
*H04L 9/08* (2006.01)
*H04W 12/04* (2009.01)
*H04L 29/06* (2006.01)
*H04W 84/18* (2009.01)

(52) U.S. Cl.
CPC ............ *H04L 9/083* (2013.01); *H04W 12/04* (2013.01); *H04L 63/0853* (2013.01); *H04L 2209/80* (2013.01); *H04W 84/18* (2013.01)

(58) Field of Classification Search
CPC ...................................................... H04L 9/083
See application file for complete search history.

(56) References Cited

U.S. PATENT DOCUMENTS

| | | | |
|---|---|---|---|
| 7,362,865 B2 * | 4/2008 | Karp | H04L 29/12311 380/270 |
| 7,596,368 B2 | 9/2009 | Yamada et al. | |
| 8,325,627 B2 * | 12/2012 | Pratt, Jr. | H04L 12/66 370/255 |
| 2002/0065631 A1 | 5/2002 | Loechner | |
| 2004/0205330 A1 * | 10/2004 | Godfrey et al. | 713/150 |

(Continued)

FOREIGN PATENT DOCUMENTS

WO  WO 03/023536 A1  3/2003

OTHER PUBLICATIONS

International Search Report and Written Opinion from International Patent Application Serial No. PCT/US2008/012697, dated Feb. 3, 2009, 6 pages.

(Continued)

*Primary Examiner* — Simon P Kanaan
(74) *Attorney, Agent, or Firm* — Kinney & Lange, P.A.

(57) ABSTRACT

A wireless mesh network provides secure communication by encrypting data using one or more encryption keys. A configuration device in communication with a security manager of the network provides a temporary secure communication path between the security manager and a new field device to be added to the mesh network. Cryptographic material and other configuration data can then be transferred between the security manager of the network and the new field device securely via the configuration device.

9 Claims, 4 Drawing Sheets

(56) References Cited

U.S. PATENT DOCUMENTS

| | | |
|---|---|---|
| 2004/0228490 A1 | 11/2004 | Klemba et al. |
| 2005/0201349 A1 | 9/2005 | Budampati |
| 2005/0231583 A1 | 10/2005 | Maghakian |
| 2005/0232428 A1 | 10/2005 | Little et al. |
| 2005/0251680 A1 | 11/2005 | Brown et al. |
| 2005/0281215 A1 | 12/2005 | Budampati et al. |
| 2006/0002368 A1 | 1/2006 | Budampati et al. |
| 2006/0062391 A1* | 3/2006 | Lee ............... H04L 63/061 380/270 |
| 2006/0227729 A1 | 10/2006 | Budampati et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2008/0003556 A1* | 1/2008 | Takahashi et al. ....... 434/307 R |
| 2008/0082698 A1 | 4/2008 | Schnaare |
| 2008/0273486 A1* | 11/2008 | Pratt ............... H04L 12/403 370/328 |

OTHER PUBLICATIONS

India Office Action for Indian Patent Application No. 3141/DELNP/2010, dated Apr. 28, 2017, 9 pages.

\* cited by examiner

WIRELESS MESH NETWORK WITH SECURE AUTOMATIC KEY LOADS TO WIRELESS DEVICES

CROSS-REFERENCE TO RELATED APPLICATION(S)

This is a continuation of U.S. patent application Ser. No. 11/983,943, entitled "WIRELESS MESH NETWORK WITH SECURE AUTOMATIC KEY LOADS TO WIRELESS DEVICES," filed Nov. 13, 2007 by Robert J. Karschnia, Marcos Peluso, Daniel Carlson, and Jeffrey D. Potter.

BACKGROUND OF THE INVENTION

The present invention relates to devices that communicate over a wireless mesh network. In particular, the present invention relates to automatic and secure loading of encryption keys into devices prior to the devices joining a wireless mesh network.

Wireless data communication and control will be a dominant player in future sensor automation, process control, security, and safety regulation. One of the important requirements for wireless data communication and control is that the devices communicating over the network minimize power consumption.

In wireless mesh network systems designed for low power, sensor/actuator-based applications, many devices in the network must be powered by long-life batteries or by low power energy-scavenging power sources. Power outlets, such as 120 VAC utilities, are typically not located nearby or may not be allowed into the hazardous areas where the instrumentation (sensors) and actuators must be located without incurring great installation expense. The need for low installation cost drives the need for battery-powered devices communicating as part of a wireless mesh network. Effective utilization of a limited power source, such as a primary cell battery which cannot be recharged, is vital for a well functioning wireless device. Batteries are expected to last more than 5 years and preferably as long as the life of the product.

In a true wireless mesh network, which may also be referred to as a self-organizing multi-hop network, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast a point-to-point system which employs remote devices talking directly to a centralized base-station.

A mesh network protocol allows for the formation of alternate paths for messaging between devices and between devices and a data collector, or a bridge or gateway to some higher level higher-speed data bus. Having alternate, redundant paths for wireless messages enhances data reliability by ensuring there is at least one alternate path for messages to flow even if another path gets blocked or degrades due to environmental influences or due to interference.

Some mesh network protocols are deterministically routed such that every device has an assigned parent and at least one alternate parent. In the hierarchy of the mesh network, much as in a human family, parents have children, children have grandchildren, and so on. Each device (or "node") relays the messages for their descendants through the network to some final destination such as a gateway. The parenting devices may be battery-powered or limited-energy powered devices. The more descendants a node has, the more traffic it must route, which in turn directly increases its own power consumption and diminishes its battery life.

In order to save power, some protocols limit the amount of traffic any node can handle during any period of time by only turning on the radios of the nodes for limited amounts of time to listen for messages. Thus, to reduce average power, the protocol may allow duty-cycling of the radios between On and Off states. Some protocols use a global duty cycle to save power such that the entire network is On and Off at the same time. Other protocols (e.g. TDMA-based) use a local duty cycle where only the communicating pair of nodes that are linked together are scheduled to turn On and Off in a synchronized fashion at predetermined times. Typically, the link is pre-determined by assigning the pair of nodes a specific time slot for communications, an RF frequency channel to be used by the radios, who is to be receiving (Rx), and who is to be transmitting (Tx) at that moment in time.

Mesh networks use a process known as "joining" to incorporate new devices into the secured network. During the joining process, a number of information exchanges and configurations take place.

The new device uses a network predetermined channel to discover similar devices within radio range. These are the existing network nodes the new device has available to it in order to gain membership into the network. The presence of each device within range is recorded. The new device sends a message to establish a handshake protocol with a neighbor device, asks to join the network, and provides a device number and network ID. The neighbor communicates the request to a network manager, which for example may be a software program running on a network gateway or a server connected to the gateway. The new device will provide its "neighbor" list to the network manager so that the network manager can determine the links that must be established to allow the new device to participate in the network.

The new device receives a joining message from the network manager. The new device then sends back the expected response along with other information necessary for the network manager to establish links from the new device to other devices in the network.

The new device and its new parents and children receive and implement configuration information from the network manager to establish the required links. The new device is then fully joined and participating in the network.

For wireless mesh networks, communication security and ease of use are two important features. These two features can be at odds, because communication security implies complexity and an opportunity for things to go wrong.

In one approach used in wireless mesh networks, security is predicated on a symmetric join key mechanism. By loading the correct join key into a device, that device is then capable of communicating with its neighbors and the gateway of the mesh network in a secure way. In this approach, during the joining process, the message to the neighbor device is encrypted by the new device using its stored join key. If the new device has the wrong join key, the join request will be rejected by the neighbor and will not be sent on to the network manager. The new device also uses the join key to decode the joining message from the network manager. Other approaches to security are possible that do not require a symmetric join key mechanism. These other approaches make use of asymmetric or symmetric encryption keys or other cryptographic material stored in the devices to provide network security.

One challenge with wireless mesh networks is how to load cryptographic material (such as a join key or other symmetric or asymmetric keys) to the wireless device the first time. If the loading is done manually, human errors can occur. If the loading is done through wireless communication with the device, the communication is not secure, and another wireless device within range may be able to receive and possibly misuse the cryptographic material that was intended for the new device that is being loaded.

BRIEF SUMMARY

Cryptographic material (such as an encryption key or join key) for use by a wireless device in communicating over a wireless mesh network is loaded into the wireless device with the use of a configuration device. When a new wireless device is being configured in anticipation of being installed in a wireless mesh network, the configuration device provides a secure communication path between the security manager of the wireless mesh network and the wireless device. The cryptographic material, as well as other configuration data, is transferred between the security manager and the wireless device via the configuration device.

In one embodiment, the connection between the configuration device and the wireless device is by a wireless communication protocol through a shielded antenna that surrounds the antenna of the wireless device. The shielded antenna prevents wireless transmissions between the configuration device and the wireless device from being received by any nearby wireless device.

In another embodiment, a temporary wired connection is made between the configuration device and the wireless device. The configuration data and cryptographic material is provided from the configuration device over the wired connection to the wireless device. A control system communication protocol (such as, for example, the HART protocol) can be used to provide the configuration data and the cryptographic material to the wireless device.

DETAILED DESCRIPTION

Figure 1:
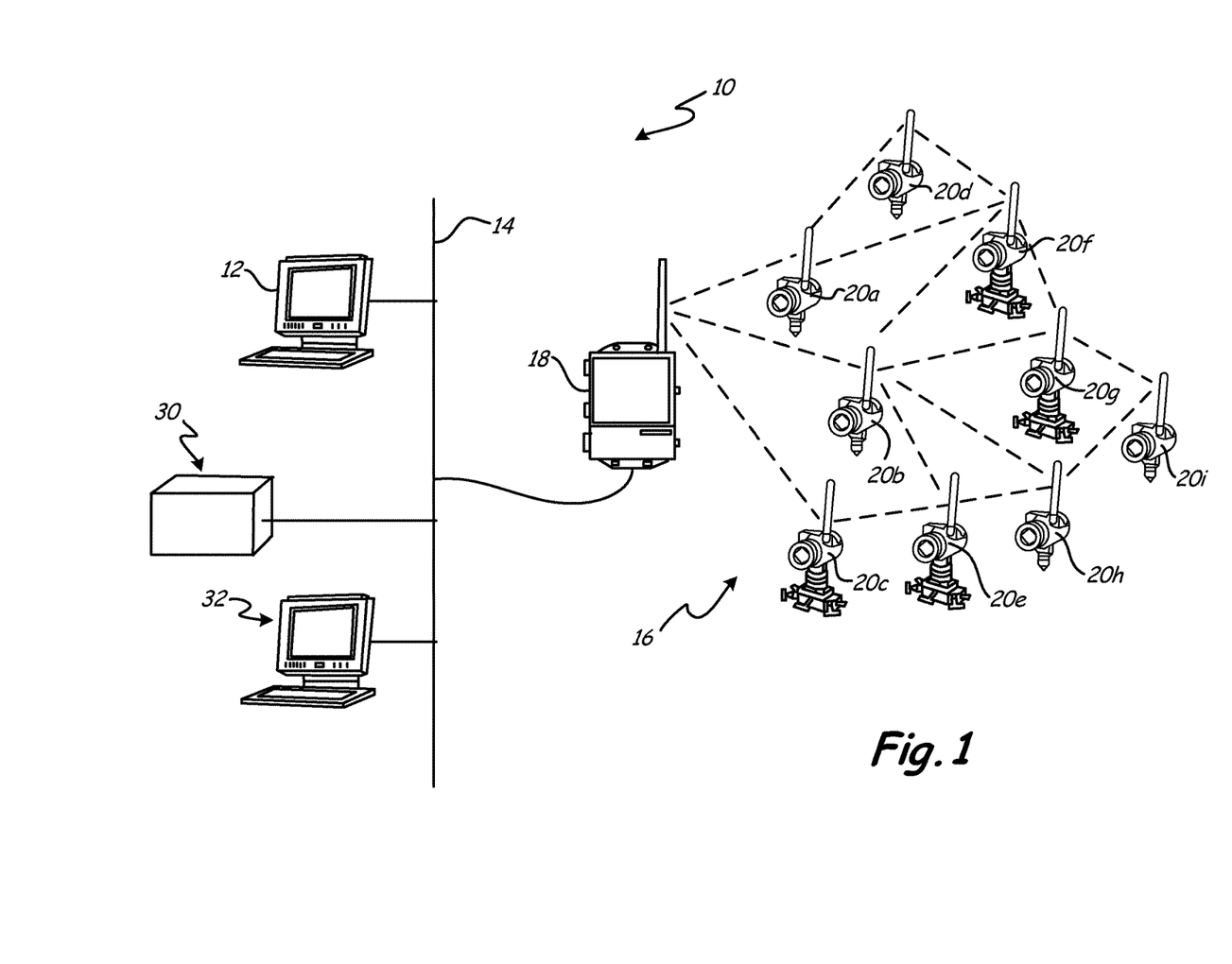
FIG. 1 is a diagram illustrating a process control/monitoring system in which a wireless mesh network routes messages between a host and field devices.

FIG. 1 shows process control/monitoring system 10, which includes host computer 12, high-speed network 14, wireless mesh network 16 (which includes gateway 18 and wireless field devices or nodes 20a-20i), configuration device 30, and network computer 32. Gateway 18 interfaces mesh network 16 with host computer 12 over high-speed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over high-speed network 14.

New wireless field devices can be added to network 16 using a joining process. In one embodiment, security within network 16 is predicated on a symmetric join key mechanism. The correct join key must be loaded into a field device so that the device will be accepted by other field devices and by the gateway. The join key must be loaded in a secure fashion, so that another wireless device within range cannot receive and possibly misuse the join key. Although join keys can be loaded manually into each new field device, manual loading can be prone to errors and exposes cryptographic material to human operators.

The goal is to load cryptographic material such as keys into new field devices in a secure fashion. This may be achieved through a secure wireless communication path (as described later in conjunction with FIGS. 2A and 2B) or a secure wired communication path (as described in conjunction with FIG. 3) between gateway 18 and the new field device. In both cases, configuration device 30 is connected to network 14, along with network computer 32 which provides a graphical user interface (GUI) which may include, for example, a web browser. Configuration device 30 and the GUI on computer 32 allow a technician to interrogate the network security manager (which may be, for example, an application program running on gateway 18 or host computer 12), obtain the correct join key (or other cryptographic material) for the new field device, and securely load the join key into the new field device. Once the join key and other required information has been loaded, the new field device can be installed in the field, where it can use its stored join key as part of the joining process to become part of wireless network 16.

Host computer 12 may be a distributed control system host running application programs to facilitate sending messages to field devices 20a-20i, and receiving and analyzing data contained in messages from field devices 20a-20i. Host computer 12 may use, for example, AMS (TM) Device Manager as an application program to allow users to monitor and interact with field devices 20a-20i.

Gateway 18 can communicate with host computer 12 over network 14 using a number of different communication protocols. In one embodiment, network 14 is an RS485 two wire communication link, on which gateway 18 may communicate with host computer 12 using the MODBUS protocol. In another embodiment, network 14 is an Ethernet network, and communication over network 14 can support MODBUS TCP/IP using an Ethernet interface.

Gateway 18 may also serve as a web server (or may have an associated web server), to allow users on network 14 to access field devices 20a-20i of wireless network 16 and to process data. The web server allows gateway 18 to be configured using a computer with a standard web browser and a secure Ethernet connection to network 14. User configurable monitoring pages generated by gateway 18 allow measured values from field devices 20a-20i to be grouped and easily viewed with a web interface. The web page generated by gateway 18 can be viewed by accessing network 14 through host computer 12, or another computer or network device (such as computer 32) connected to network 14. An example of a suitable device to perform the functions of gateway 18 is the Rosemount 1420 wireless gateway from Rosemount Inc. In other embodiments, information may be provided through GUIs in other formats, without the need for a web browser and web server.

System 10 can make use of field devices that have been designed for and used in wired distributed control systems, as well as field devices that are specially designed as wireless transmitters for use in wireless mesh networks. Examples of wireless transmitters include the Rosemount 30515 wireless level transmitter, Rosemount 648 wireless temperature transmitter, and Rosemount 30515 wireless pressure transmitters from Rosemount Inc. These wireless transmitters are also capable of use in wired systems.

Wireless network 16 is preferably a low power network in which many of the nodes are powered by long life batteries or low power energy scavenging power sources. Communication over wireless network 16 may be provided according to a mesh network configuration, in which messages are transmitted from node-to-node through network 16. This allows the use of lower power RF radios, while allowing the network 16 to span a significant physical area to deliver messages from one end of the network to the other.

In a wired control/monitoring system, interaction between the host computer and the field devices occurs using well known control messages according to a control system communication protocol such as HART, Foundation Fieldbus, Profibus, or the like. Field devices capable of use in both wired systems and wireless systems can make use of control messages according to one of the known control message protocols. In some cases, wireless field devices 20a-20i, which are part of wireless network 16, may not be able to directly exchange these well known control messages with host computer 12 because the wireless communication over network 16 occurs according to a wireless protocol that is general purpose in nature.

Rather than require host computer 12 and field devices 20a-20i to communicate using wireless protocol, a method can be provided to allow sending and receiving well known field device control messages between host computer 12 and field devices 20a-20i over wireless network 16. The well known field device control messages can be embedded into the general purpose wireless protocol so that the control messages can be exchanged between host computer 12 and field devices 20a-20i to achieve control of an interaction with field devices 20a-20i. As a result, wireless network 16 and its wireless communication protocol is essentially transparent to host computer 12 and field devices 20a-20i. In the following description, the HART protocol will be used as an example of a known control system communication protocol, although other protocols (e.g. Foundation Fieldbus, Profibus, etc.) can be used as well.

A similar issue relates to the addresses used by host computer 12 to direct messages to field devices 20a-20i. In wired systems, the host computer addresses each field device with a unique field device address. The address is defined as part of the particular communication protocol being used, and typically forms a part of control messages sent by the host computer to the field devices.

When a wireless network, such as network 16 shown in FIG. 1, is used to route messages from the host computer to field devices, the field device addresses used by the host computer may not be compatible with the wireless addresses used by the communication protocol of the wireless network.

One way to deal with addresses is to require host computer 12 to use wireless addresses rather than field device addresses. This approach, however, requires host computer 12 to be programmed differently depending upon whether it is communicating over wired communication links with field devices, or whether it is communicating at least in part over a wireless network. In addition, there remains the issue of multiple field devices, which will typically have different purposes, and which need to be addressed individually.

An alternative approach uses gateway 18 to translate field device addresses provided by host computer 12 into corresponding wireless addresses. A wireless message is sent to the wireless address, and also includes a field device address so that the node receiving the message can direct the message to the appropriate field device. By translating field device addresses to corresponding wireless addresses, host computer 12 can function in its native field address domain when interacting with field devices.

In one embodiment, host computer 12 communicates with gateway 18 using messages in extendable markup language (XML) format. Control messages intended for field devices 20a-20i are presented according to the HART protocol, and are communicated to gateway 18 in XML format.

In one embodiment, gateway 18 includes a gateway interface, a network (or mesh) manager, and a radio transceiver. The gateway interface receives the XML document from host computer 12, extracts the HART control message, and modifies the control message into a format to be embedded in a wireless message that will be transmitted over wireless network 16.

The network or mesh manager forms the wireless message with the HART control message embedded, and with the wireless address of the node corresponding to the field device to which the HART message is directed. The mesh manager may be maintaining, for example, a lookup table that correlates each field device address with the wireless address of the node at which the field device corresponding to that field device address is located. The wireless message according to the wireless protocol includes the wireless node address, which is used to route the wireless message through network 16. The field device address is contained in the HART message embedded within the wireless message, and is not used for routing the wireless message through network 16. Instead, the field device address is used once the wireless message has reached the intended node.

The mesh manager causes the radio in gateway 18 to transmit the wireless message, so that it will be transmitted by one or multiple hops within network 16 to the intended field device. For example, the message to field device 20f may be transmitted from gateway 18 to field device 20a and then to field device 20f, or alternatively from gateway 18 to field device 20b and then to field device 20f. Other routes are also possible in network 16.

The use of embedded control messages (in a control message protocol) within wireless messages (in a wireless protocol) enables the host computer of a distributed control system to interact with field devices through a wireless communication network. Control messages can be exchanged between the host computer and the field devices using known control message formats, such as HART, Fieldbus, or the like, without having to be modified by either the host computer or the field devices to accommodate transmission of the control messages over the wireless network. The control message is embedded within the wireless communication protocol such that the substance of the control message exchanged between the host computer and the field device is unmodified as a result of having passed through the wireless network.

Control messages that are too large to be routed through the wireless communication protocol can be broken into parts and sent as multiple parts. Each part is embedded in a wireless message, and the multiple parts can be reassembled into the original control message as the multiple parts exit the wireless network. By use of a message ID in the embedded control message, the multiple parts can be reassembled in proper order, even though individual wireless messages having embedded parts of the original control message may take different paths through the wireless network.

The translation of field device addresses to corresponding wireless addresses allows host 12 to function in its native field device address domain, while interacting with field devices within the wireless address domain. The use of wireless network 16 to route messages to and from the field devices is transparent to host 12. The address translation and inclusion of both the wireless address and the field device address in the wireless message allows multiple field devices associated with a single node (i.e. a single wireless address) to be addressed individually.

Figure 2A:
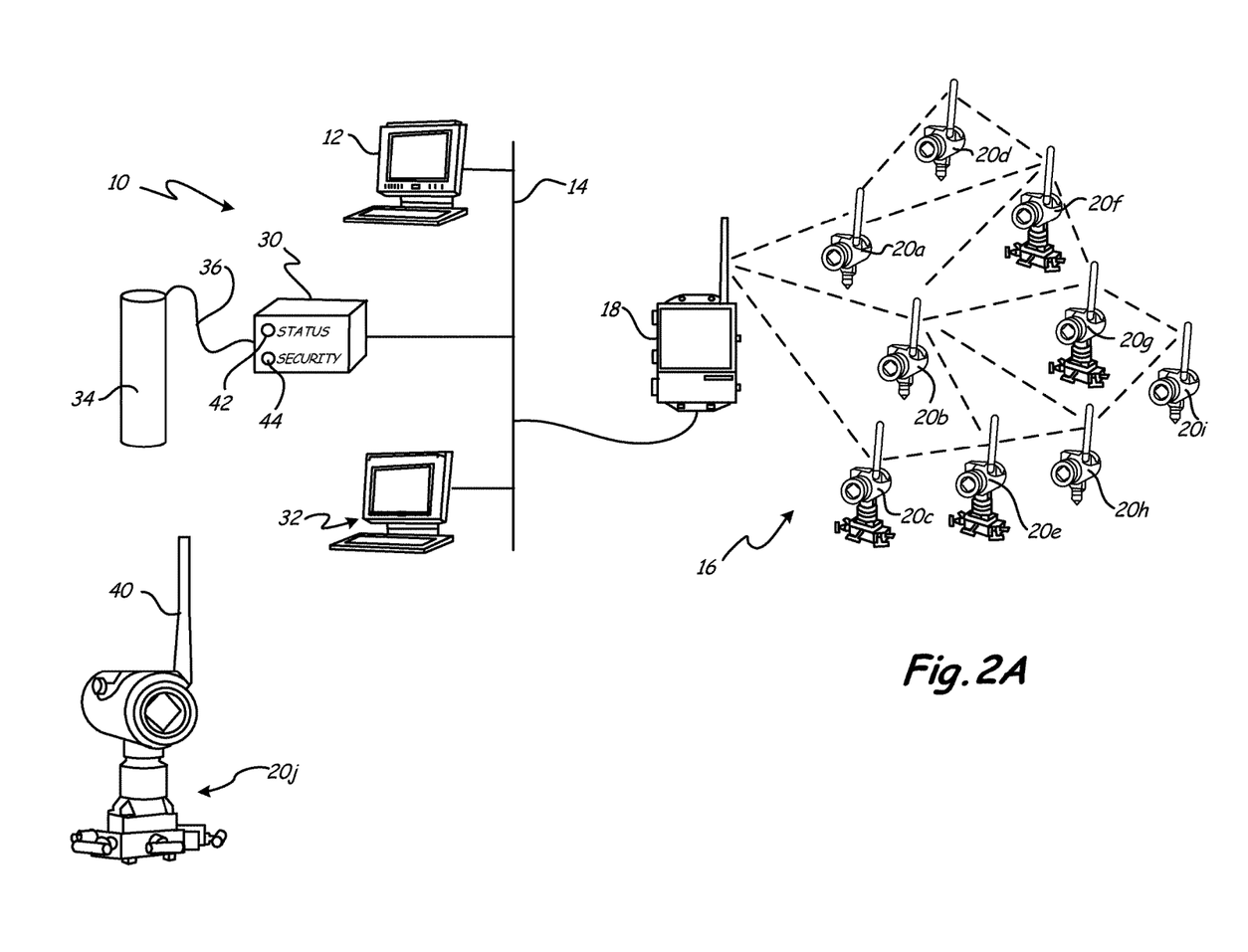
FIGS. 2A and 2B are diagrams illustrating loading cryptographic material into a field device to be added to the system of FIG. 1 using a configuration device to provide a secure wireless communication path.
Figure 2B:
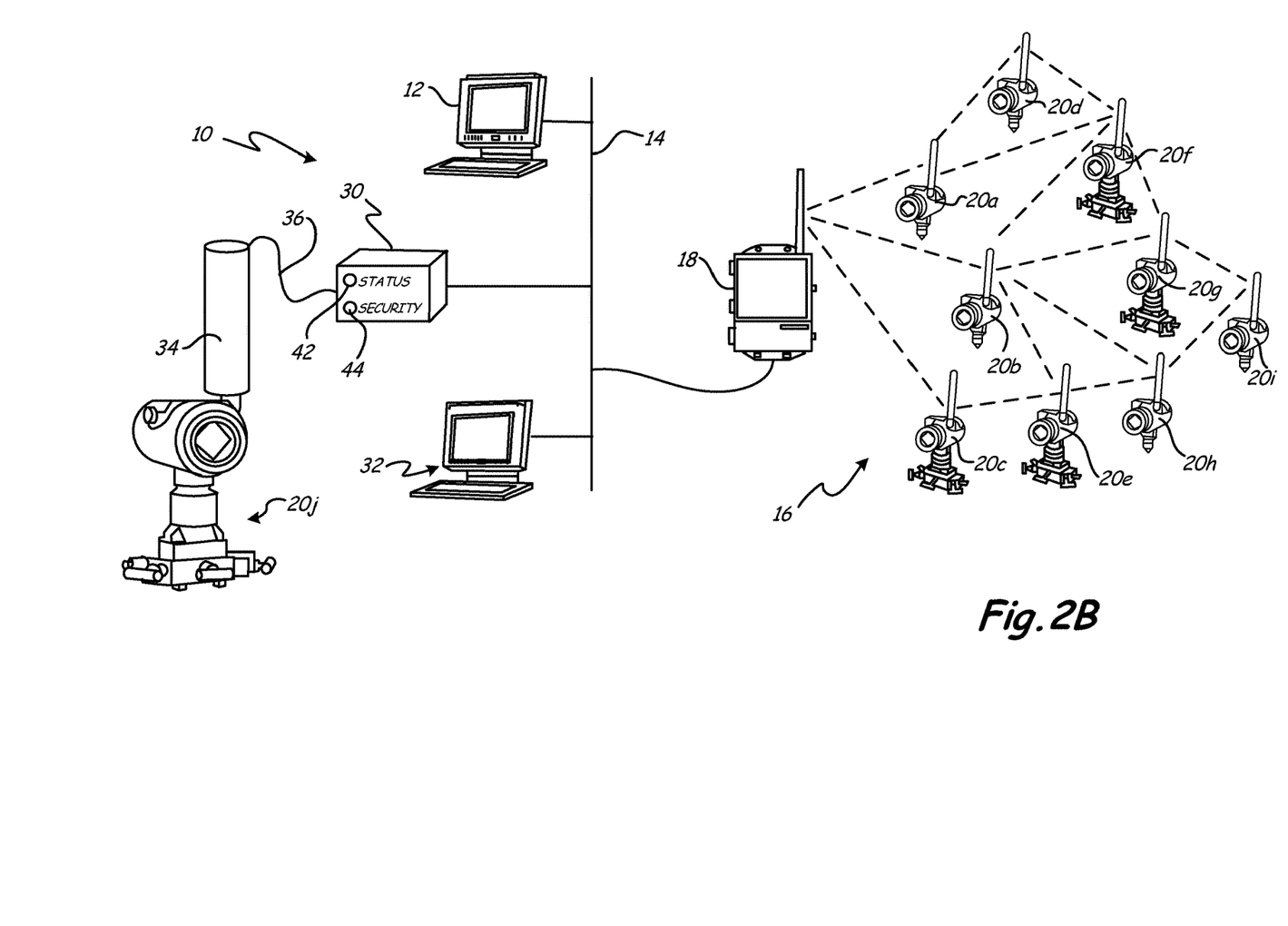

FIGS. 2A and 2B show new field device 20j, which needs to be configured by loading cryptographic material (such as a join key) so that it can be added to wireless network 16. In this embodiment, a technician makes use of configuration device 30, computer 32, tubular antenna 34, and coaxial cable 36 to interrogate gateway 18, obtain the necessary join key, and supply the join key to new field device 20j through wireless communication between antenna 34 and antenna 40 of field device 20j.

In typical practice, the loading of cryptographic material such as a join key into new device 20j may be performed by a technician in a laboratory or workshop prior to the installation of device 20j in the field. Configuration device 30 and computer 32 are connected to network 14 at the workshop or laboratory. The join key loading process is initiated by establishing communication with gateway 18 for wireless network 16, into which the new field device will be added. In some cases, multiple gateways may reside on network 14, and may interact with the same wireless network or different wireless networks.

The technician can access information using the GUI running on computer 32. For example, the information may be formatted in web pages produced by a web server of gateway 18. One of the web pages provided by gateway 18 allows the technician to add a new field device to wireless network 16. This may be in the form of an "add" button on the web page. When the add feature is requested (i.e. the add button is clicked), gateway 18 then sends cryptographic material (such as a join key) to be used by new field device 20j through a secure communication path established by configuration device 30. The cryptographic material is provided by the security manager of the network, which may be a program running on gateway 18 or host computer 12, for example.

Tubular antenna 34 is placed over antenna 40 of new field device 20j, as shown in FIG. 2B. With tubular antenna 34 in place, wireless communication can take place between antenna 34 and antenna 40, so that cryptographic material can be loaded in a secure fashion. Tubular antenna 34 may be, for example, a metal pipe (such as copper) or a metallic mesh tube with a plastic coating. RF signals delivered by the coax cable 36 to the interior of tube 34 are shielded from surrounding devices by the metal pipe or mesh tube, so that only antenna 40 can receive the RF signals from configuration device 30.

In the embodiment shown in FIGS. 2A and 2B, configuration device 30 includes status indicators 42 and 44, which may be, for example, light emitting diodes. Alternatively, a display, (such as a liquid crystal display) may be used instead of, or in addition to indicators 42 and 44. Configuration device 30 can also provide authentication that new field device 20j is valid, and should be added to the list of field devices maintained by gateway 18. Indicators 42 and 44 can provide status and security information during this authentication process. For example, in one embodiment indicator 42 may indicate that the status of device 20j is unknown when indicator 42 is turned on, and may indicate that the status of device 20j is being verified when indicator 42 is blinking. Similarly, indicator 44 may indicate that field device 20j is a valid device by blinking, and may indicate that security keys have been loaded when indicator 44 is turned on continuously.

During the authentication process, information can be exchanged between the security manager and new field device 20j through the secure communication path established by antenna 34, coax cable 36, and configuration device 30. For example, device number and network ID information may be exchanged.

Figure 3:
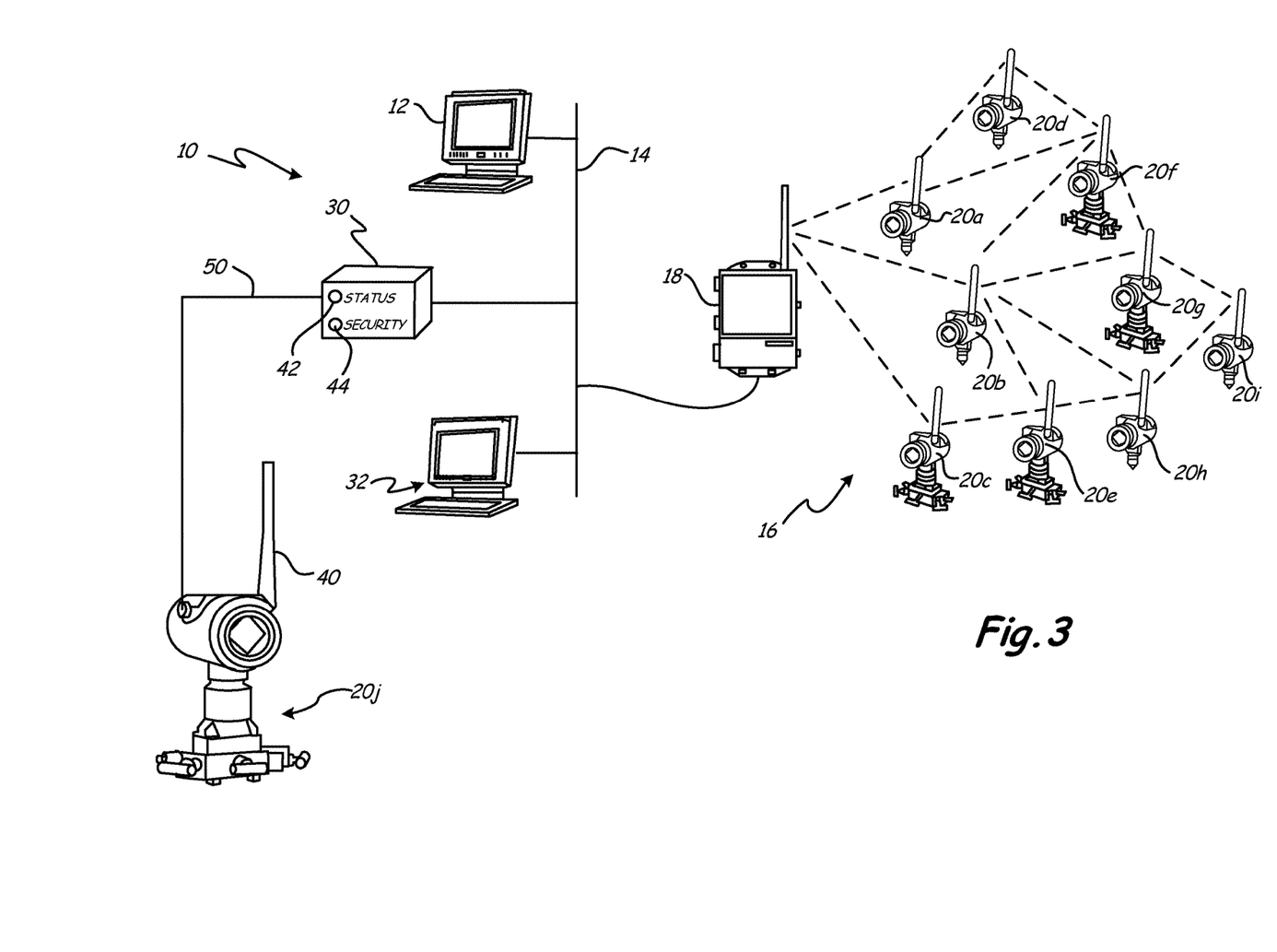
FIG. 3 is a diagram illustrating loading cryptographic material into a field device to be added to the system of FIG. 1 using a configuration device to provide a secure wired communication path.

FIG. 3 shows an alternative embodiment for downloading join keys to new field devices. In this embodiment, configuration device 30 has the capability of providing messages over two wire bus 50 to wireless device 20j. In the embodiments discussed, field devices 20a-20j have the capability of operating in a wired configuration as well as in a wireless network. The embodiment shown in FIG. 3 takes advantage of that capability by providing temporary two wire connection to field device 20j over which messages can be sent in a control system communication protocol, such as HART. Configuration device 30 receives messages from gateway 18 or host computer 12 delivered over high-speed network 14, and converts them to the HART protocol for delivery over two wire communication bus 50. Reply messages from field device 20j are in the HART protocol and are delivered to configuration device 30, which converts or embeds the HART messages for transmission over high-speed network 14. The application program in configuration device 30 for converting messages from an Ethernet format to the HART protocol (FIG. 3) or a wireless protocol (FIGS. 2A and 2B) can be similar to the application program used by gateway 18 to perform similar format transformations between high-speed network 14 and wireless network 16.

Like the embodiment shown in FIGS. 2A and 2B, the embodiment in FIG. 3 permits loading of cryptographic material, as well as authentication of new field device 20j. Indicators 42 and 44 of configuration device 30 in FIG. 3 can provide the same status and security information as described reference to FIGS. 2A and 2B.

The cryptographic material downloaded by configuration device 30 can be unique for each field device, or can be unique for each network. The use of a unique key for a single message has historically been referred to as a "one time pad". This offers the best form of protection against a brute force attack on network security because there is no statistical data on which to base the attack. By using this technique, a join key can be set up to be only used once and only by a device that has been pre-approved.

Other configuration data that can be downloaded from gateway 18 or host computer 12 includes network IDs and network keys. The extent of configuration data to be transferred through configuration device 30 to a new field device can be selectable by a technician through the GUI on computer 32. In other cases, the configuration data to be transferred may be automatically determined by gateway 18.

The use of a configuration device that establishes a secure communication path between gateway 18 and a new field device (such as field device 20j) allows an automated process for loading cryptographic material, and performing other configuration and authentication needed in order to install field device 20j into wireless network 16. The transfer of cryptographic material and other configuration data, and the authentication process, can be performed automatically, without requiring any manual inputs by the technician. The process can be controlled by the technician through a GUI on computer 32 connected to network 14. In some cases, the GUI can include a web browser that makes use of web pages provided by a web server of gateway 18.

Configuration device 30 is simple, with a minimum number of connections. The functions performed by configuration device 30 are specialized and limited, and therefore the application program required is relatively small and the hardware required is relatively inexpensive. In some cases, functionality for both secure wireless and wired communication with field devices can be provided in the same configuration device. In other cases, only the form of secure communication needed may be provided.

The same configuration device can be used with multiple gateways. The particular gateway (and wireless network) can be selected through the GUI on computer 32 by selecting the particular wireless network that the new field device will be joining.

In another embodiment, the functions of configuration device 30 and computer 32 can be combined in a single device. For example, configuration device 30 could include a user interface (display and keyboard or touch screen inputs) to view and interact with the security manager directly.

Although the present invention has been described with reference to preferred embodiments, workers skilled in the art will recognize that changes may be made in form and detail without departing from the spirit and scope of the invention.

The invention claimed is:

1. A method of integrating a specific wireless field device into a wireless mesh network by loading a join key into the specific wireless field device, wherein the join key is usable by any wireless field device capable of joining the wireless mesh network, the method comprising:
    establishing a wired network connection between a configuration device and a wired network, wherein the wired network includes a security manager and a network gateway and wherein the configuration device is separate and remote from the network gateway;
    establishing a wired connection comprising a two wire communication bus between the specific wireless field device and the configuration device;
    creating a secure wired communication path between the specific wireless field device and the security manager through the wired connection, the configuration device, and the wired network;
    initiating loading the join key from the security manager to the specific wireless field device through the secure wired communication path;
    disconnecting the specific wireless field device from the wired connection between the specific wireless field device and the configuration device after loading of the join key from the security manager to the specific wireless field device is completed; and
    joining the specific wireless field device to the wireless mesh network by wirelessly communicating a wireless message encrypted with the join key from the specific wireless field device to a neighboring wireless device that is a member of the wireless mesh network and wirelessly communicating the wireless message from the neighboring wireless device to a network manager within the wireless mesh network that manages joining of members of the wireless mesh network.

2. The method of claim 1, wherein the configuration device communicates with the specific wireless field device over the wired network connection using a control system communication protocol.

3. The method of claim 2, wherein the configuration device converts messages received from the security manager over the wired network to the control system communication protocol.

4. The method of claim 1 and further comprising:
    loading configuration data in addition to the join key through the secure wired communication path.

5. The method of claim 1 and further comprising:
    viewing a graphical user interface; and
    initiating loading of the join key through the graphical user interface.

6. The method of claim 1, wherein the wired network comprises a wired digital communication network to which the configuration device is connected.

7. The method of claim 1, wherein the join key includes a key generated using a one time pad technique.

8. A method of loading cryptographic material into a specific wireless field device to allow the specific wireless field device to operate as part of a wireless mesh network, wherein the cryptographic material is usable by any wireless field device capable of joining the wireless mesh network, the method comprising:
    establishing a wired network connection between a configuration device and a security manager of the wireless mesh network, that includes a network gateway and wherein the configuration device is separate and remote from the security manager and the network gateway;
    establishing a wired connection between the specific wireless field device and the configuration device, wherein the wired connection ensures messages generated by the configuration device are receivable only by the specific wireless field device;
    establishing a secure communication path between the security manager and the specific wireless field device via the wired connection, the configuration device and the wired network;
    initiating loading of the cryptographic material from the security manager to the specific wireless field device through the secure communication path so that the cryptographic material is receivable only by the specific wireless field device;
    disconnecting the specific wireless field device from the secure communication path after the loading of the cryptographic material from the security manager to the specific wireless field device is completed; and
    joining the specific wireless field device to the wireless mesh network by transferring a wireless message including the cryptographic material from the specific field device to any member of the wireless mesh network and wirelessly communicating the wireless message from the any member of the wireless mesh network to a network manager within the wireless mesh network that receives the wireless message and manages joining of members of the wireless mesh network.

9. The method of claim 8, wherein the cryptographic material includes a join key generated using a one time pad technique.

* * * * *

UNITED STATES PATENT AND TRADEMARK OFFICE
CERTIFICATE OF CORRECTION

PATENT NO. : 10,153,898 B2
APPLICATION NO. : 13/479869
DATED : December 11, 2018
INVENTOR(S) : Robert J. Karschnia et al.

Page 1 of 1

It is certified that error appears in the above-identified patent and that said Letters Patent is hereby corrected as shown below:

In the Specification

Column 5, Line 6:
Delete "30515"
Insert --3051S--

Column 5, Line 7:
Delete "30515"
Insert --3051S--

Signed and Sealed this
Twenty-sixth Day of February, 2019

Andrei Iancu
*Director of the United States Patent and Trademark Office*